US012308980B2

(12) United States Patent
Zhang et al.

(10) Patent No.: US 12,308,980 B2
(45) Date of Patent: May 20, 2025

(54) METHODS AND APPARATUSES FOR RDS TRANSFER

(71) Applicant: Telefonaktiebolaget LM Ericsson (publ), Stockholm (SE)

(72) Inventors: Bo Zhang, Guangzhou (CN); Fengpei Zhang, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 18/008,113

(22) PCT Filed: Jun. 5, 2020

(86) PCT No.: PCT/CN2020/094738
§ 371 (c)(1),
(2) Date: Dec. 2, 2022

(87) PCT Pub. No.: WO2021/243715
PCT Pub. Date: Dec. 9, 2021

(65) Prior Publication Data
US 2023/0275707 A1 Aug. 31, 2023

(51) Int. Cl.
*H04W 28/02* (2009.01)
*G06F 15/16* (2006.01)
*H04L 1/1867* (2023.01)
*H04L 69/24* (2022.01)

(52) U.S. Cl.
CPC .............. *H04L 1/187* (2013.01); *H04L 69/24* (2013.01)

(58) Field of Classification Search
CPC ......... H04L 1/187; H04L 67/06; H04L 47/27; H04L 69/24; H04L 67/01; H04L 69/326; H04W 16/14; H04W 60/00
USPC .......................................................... 370/235
See application file for complete search history.

(56) References Cited

U.S. PATENT DOCUMENTS 7,110,388 B2 * 9/2006 Hameleers ............ H04W 88/16 370/349
10,433,337 B2 * 10/2019 Choi .................. H04W 72/542
2004/0042465 A1 * 3/2004 Lee ....................... H04L 69/326 370/252

(Continued)

FOREIGN PATENT DOCUMENTS

CN 109714653 A 5/2019
CN 110535781 A 12/2019

(Continued)

OTHER PUBLICATIONS

International Search Report and Written Opinion with Transmittal dated Feb. 24, 2021 in International Application No. PCT/CN2020/094738 (9 pages).

(Continued)

*Primary Examiner* — Edan Orgad
*Assistant Examiner* — Vanneilian Lalchinthang
(74) *Attorney, Agent, or Firm* — Sonoda & Kobayashi Intellectual Property Law; Sarvajit S. Patil

(57) ABSTRACT

Methods and apparatuses for reliable data service (RDS) transfer are disclosed. According to an embodiment, an originator sends, to a receiver, a request for negotiating a size of a transmission window with the receiver for an acknowledged information transfer through RDS protocol. The originator receives, from the receiver, a response to the request.

18 Claims, 9 Drawing Sheets

(56) References Cited

U.S. PATENT DOCUMENTS

| | | | | |
|---|---|---|---|---|
| 2012/0143993 A1* | 6/2012 | Russo | H04L 69/24 709/219 |
| 2015/0249702 A1* | 9/2015 | Russo | H04L 47/27 709/203 |
| 2019/0261453 A1* | 8/2019 | Jain | H04W 8/183 |
| 2021/0099733 A1* | 4/2021 | Xie | H04N 21/4307 |
| 2022/0078863 A1* | 3/2022 | Gupta | G06F 9/54 |

FOREIGN PATENT DOCUMENTS

| | | | | |
|---|---|---|---|---|
| EP | 3 577 941 A1 | 12/2019 | |
| WO | WO-2018144249 A1 * | 8/2018 | H04W 16/14 |

OTHER PUBLICATIONS

Intel et al., "Issues in Reliable Data Service for NIDD between UE and SCEF", C1-172234, 3GPP TSG CT WG1 Meeting #104, May 15-19, 2017, Zhangjiajie, P.R of China (3 pages).

3GPP TS 23.682 V15.10.0, Dec. 2019, 3rd Generation Partnership Project; Technical Specification Group Services and System Aspects; Architecture enhancements to facilitate communications with packet data networks and applications (Release 15) (127 pages).

3GPP TS 29.122 V15.6.0, Dec. 2019, 3rd Generation Partnership Project; Technical Specification Group Core Network and Terminals; T8 reference point for Northbound APIs; (Release 15) (300 pages).

3GPP TS 24.250 V15.1.0, Dec. 2018, 3rd Generation Partnership Project; Technical Specification Group Core Network and Terminals; Protocol for Reliable Data Service between UE and SCEF; Stage 3 (Release 15) (22 pages).

* cited by examiner

When a size of a transmission window is greater than 3, perform an acknowledged information transfer through RDS protocol with a second communication device by using at least one extended frame header format ~1102

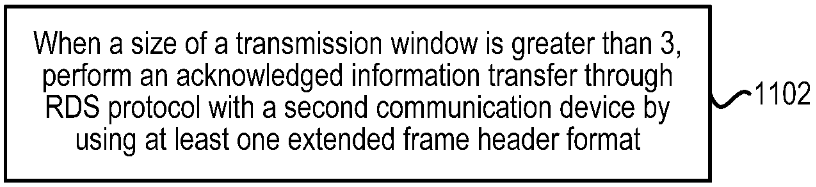

FIG. 11

Send information to the second communication device in an I frame having a second frame header format — 1204

Receive information from the second communication device in an I frame having a second frame header format — 1206

Receive an acknowledgement from the second communication device in an S frame having a fourth frame header format — 1208

Send an acknowledgement to the second communication device in an S frame having a fourth frame header format — 1210

~1102

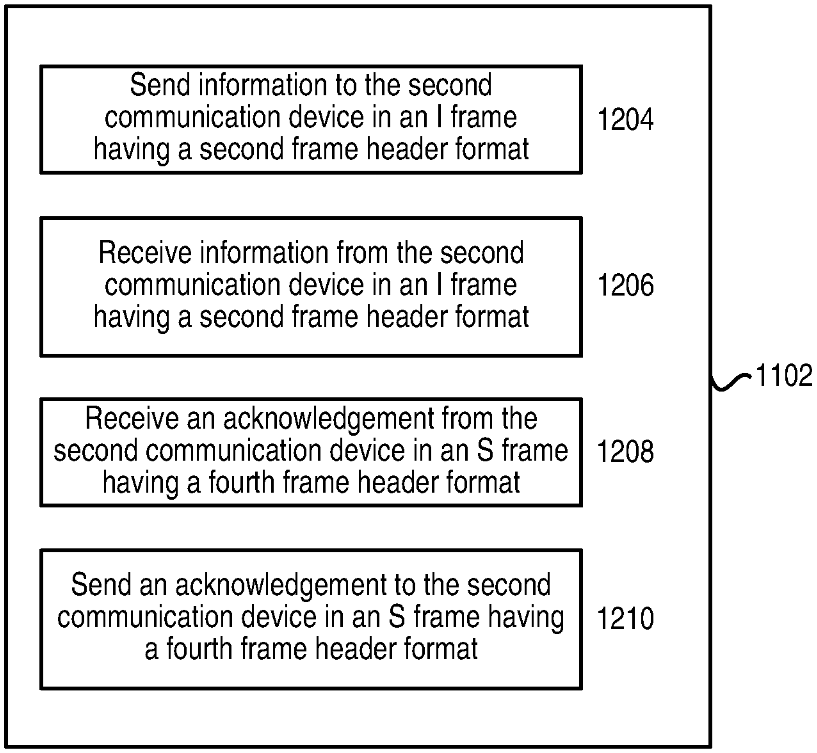

FIG. 12

Address and Control Field Bits

| Format | 8 | 7 | 6 | 5 | 4 | 3 | 2 | 1 | Octet |
|---|---|---|---|---|---|---|---|---|---|
| I Format | PD | 0 | A | E | ADS | N(S) | | | 1 |
| | N(R) | | | R1 | R2 | R3 | S1 | S2 | 2 |
| | Source Port | | | | Destination Port | | | | 3 |
| | Ext-N(S) | Ext-N(R) | R4 | R5 | R6 | R7 | X | X | 4 |
| S Format | PD | 1 | 1 | 0 | ADS | A | E | X | 1 |
| | N(R) | | | R1 | R2 | R3 | S1 | S2 | 2 |
| | Source Port | | | | Destination Port | | | | 3 |
| | Ext-N(R) | X | R4 | R5 | R6 | R7 | X | X | 4 |

METHODS AND APPARATUSES FOR RDS TRANSFER

CROSS REFERENCE TO RELATED APPLICATIONS

This application is a 35 U.S.C. § 371 National Stage of International Patent Application No. PCT/CN2020/094738, filed Jun. 5, 2020.

TECHNICAL FIELD

Embodiments of the disclosure generally relate to communication, and, more particularly, to methods and apparatuses for reliable data service (RDS) transfer.

BACKGROUND

This section introduces aspects that may facilitate better understanding of the present disclosure. Accordingly, the statements of this section are to be read in this light and are not to be understood as admissions about what is in the prior art or what is not in the prior art.

Service capability exposure function (SCEF) is the key entity within the 3rd generation partnership project (3GPP) architecture for service capability exposure that provides a means to securely expose the services and capabilities provided by 3GPP network through application programming interfaces (APIs) to service capability servers or application servers (SCSs/ASs).

The non-Internet protocol (non-IP) data delivery (NIDD) feature is used to handle mobile originated (MO) and mobile terminated (MT) communication with user equipments (UEs), where the data used for the communication is considered unstructured, which is also known as non-IP. The support of non-IP data is part of the cellular Internet of things (CIoT) evolved packet system (EPS) optimizations. The non-IP data delivery to SCS/AS is accomplished by one of two mechanisms: delivery using SCEF; and delivery using a point-to-point (PtP) SGi tunnel.

3GPP technical specification (TS) 24.250 introduces reliable data service (RDS) protocol to support both acknowledged and unacknowledged data transfer operations for NIDD. FIG. 1 is a reference model diagram showing the protocol layering for reliable data transfer between UE and AS via SCEF NIDD RDS. As shown, the RDS operates above the non-access stratum (NAS) and Diameter layers in the reference architecture.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for RDS transfer. In particular, one of the problems to be solved by the disclosure is to avoid mismatch between RDS window sizes of an originator and a receiver. Besides, another problem to be solved by the disclosure is to avoid a waste of resources due to small RDS window size.

According to a first aspect of the disclosure, there is provided a method performed by an originator. The method may comprise sending, to a receiver, a request for negotiating a size of a transmission window with the receiver for an acknowledged information transfer through RDS protocol. The method may further comprise receiving, from the receiver, a response to the request.

In this way, a window size negotiation mechanism can be provided for RDS.

In an embodiment of the disclosure, the method may further comprise performing the acknowledged information transfer based on the response to the request.

In an embodiment of the disclosure, the request may comprise a first parameter indicating a first size of the transmission window expected to be used by the originator.

In an embodiment of the disclosure, the first size of the transmission window may be an integer ranging from 1 to a maximum value greater than 3.

In an embodiment of the disclosure, the response to the request may comprise a second parameter indicating a second size of the transmission window expected by the receiver. The second size of the transmission window may be smaller than or equal to the first size of the transmission window.

In an embodiment of the disclosure, the acknowledged information transfer may be performed with the second size of the transmission window.

In an embodiment of the disclosure, the request may be an RDS SET_PARAMETERS command and the response may be an RDS SET_PARAMETERS response.

In an embodiment of the disclosure, each of the RDS SET_PARAMETERS command and the RDS SET_PARAMETERS response may comprise a parameter called Window_Size.

In an embodiment of the disclosure, the originator or the receiver may be one of: a terminal device; an service capability exposure function (SCEF); a packet data network (PDN) gateway (PGW); a network exposure function (NEF); a user plane function (UPF); a service capability server (SCS); an application server (AS); and an application function (AF).

In an embodiment of the disclosure, performing the acknowledged information transfer may comprise, when the second size of the transmission window is greater than 3, performing the acknowledged information transfer with at least one extended frame header format. The at least one extended frame header format may be an extension of at least one normal frame header format used when the second size of the transmission window is smaller than or equal to 3.

In an embodiment of the disclosure, performing the acknowledged information transfer with at least one extended frame header format may comprise sending information to the receiver in an I frame having a second frame header format. The second frame header format may be an extension of a first frame header format used when the second size of the transmission window is smaller than or equal to 3.

In an embodiment of the disclosure, the first frame header format may comprise 3 octets which contain 3 bits indicating send sequence number, 3 bits indicating receive sequence number, and 3 selective acknowledgement bitmap bits. The second frame header format may comprise: the 3 octets of the first frame header format in which one of spare bits is used as an extension header indicator bit; and one additional octet which contains a most significant bit of the send sequence number, a most significant bit of the receive sequence number, and 4 selective acknowledgement bitmap bits.

In an embodiment of the disclosure, performing the acknowledged information transfer with at least one extended frame header format may comprise receiving an acknowledgement from the receiver in an S frame having a fourth frame header format. The fourth frame header format may be an extension of a third frame header format used when the second size of the transmission window is smaller than or equal to 3.

In an embodiment of the disclosure, the third frame header format may comprise 3 octets which contain 3 bits indicating receive sequence number and 3 selective acknowledgement bitmap bits. The fourth frame header format comprises: the 3 octets of the third frame header format in which one of spare bits is used as an extension header indicator bit; and one additional octet which contains a most significant bit of the receive sequence number and 4 selective acknowledgement bitmap bits.

According to a second aspect of the disclosure, there is provided a method performed by a receiver. The method may comprise receiving, from an originator, a request for negotiating a size of a transmission window with the receiver for an acknowledged information transfer through RDS protocol. The method may further comprise sending, to the originator, a response to the request.

In this way, a window size negotiation mechanism can be provided for RDS.

In an embodiment of the disclosure, the method may further comprise performing the acknowledged information transfer based on the response to the request.

In an embodiment of the disclosure, the request may comprise a first parameter indicating a first size of the transmission window expected to be used by the originator.

In an embodiment of the disclosure, the first size of the transmission window may be an integer ranging from 1 to a maximum value greater than 3.

In an embodiment of the disclosure, the response to the request may comprise a second parameter indicating a second size of the transmission window expected by the receiver. The second size of the transmission window may be smaller than or equal to the first size of the transmission window.

In an embodiment of the disclosure, the acknowledged information transfer may be performed with the second size of the transmission window.

In an embodiment of the disclosure, the request may be an RDS SET_PARAMETERS command and the response may be an RDS SET_PARAMETERS response.

In an embodiment of the disclosure, each of the RDS SET_PARAMETERS command and the RDS SET_PARAMETERS response may comprise a parameter called Window_Size.

In an embodiment of the disclosure, the receiver or the originator may be one of: a terminal device; an SCEF; a PGW; an NEF; a UPF; an SCS; an AS; and an AF.

In an embodiment of the disclosure, performing the acknowledged information transfer may comprise, when the second size of the transmission window is greater than 3, performing the acknowledged information transfer with at least one extended frame header format. The at least one extended frame header format may be an extension of at least one normal frame header format used when the second size of the transmission window is smaller than or equal to 3.

In an embodiment of the disclosure, performing the acknowledged information transfer with at least one extended frame header format may comprise receiving information from the originator in an I frame having a second frame header format. The second frame header format may be an extension of a first frame header format used when the second size of the transmission window is smaller than or equal to 3.

In an embodiment of the disclosure, the first frame header format may comprise 3 octets which contain 3 bits indicating send sequence number, 3 bits indicating receive sequence number, and 3 selective acknowledgement bitmap bits. The second frame header format may comprise: the 3 octets of the first frame header format in which one of spare bits is used as an extension header indicator bit; and one additional octet which contains a most significant bit of the send sequence number, a most significant bit of the receive sequence number, and 4 selective acknowledgement bitmap bits.

In an embodiment of the disclosure, performing the acknowledged information transfer may comprise sending an acknowledgement to the originator in an S frame having a fourth frame header format. The fourth frame header format may be an extension of a third frame header format used when the second size of the transmission window is smaller than or equal to 3.

In an embodiment of the disclosure, the third frame header format may comprise 3 octets which contain 3 bits indicating receive sequence number and 3 selective acknowledgement bitmap bits. The fourth frame header format may comprise: the 3 octets of the third frame header format in which one of spare bits is used as an extension header indicator bit; and one additional octet which contains a most significant bit of the receive sequence number and 4 selective acknowledgement bitmap bits.

According to a third aspect of the disclosure, there is provided a method performed by a first communication device. The method may comprise, when a size of a transmission window is greater than 3, performing an acknowledged information transfer through RDS protocol, with a second communication device by using at least one extended frame header format. The at least one extended frame header format may be an extension of at least one normal frame header format used when the size of the transmission window is smaller than or equal to 3.

In this way, a larger RDS window size with fewer overheads can be supported with a mechanism compatible with the existing RDS protocol.

In an embodiment of the disclosure, performing the acknowledged information transfer by using at least one extended frame header format may comprise sending information to the second communication device in an I frame having a second frame header format. The second frame header format may be an extension of a first frame header format used when the size of the transmission window is smaller than or equal to 3.

In an embodiment of the disclosure, performing the acknowledged information transfer by using at least one extended frame header format may comprise receiving information from the second communication device in an I frame having a second frame header format. The second frame header format may be an extension of a first frame header format used when the size of the transmission window is smaller than or equal to 3.

In an embodiment of the disclosure, the first frame header format may comprise 3 octets which contain 3 bits indicating send sequence number, 3 bits indicating receive sequence number, and 3 selective acknowledgement bitmap bits. The second frame header format may comprise: the 3 octets of the first frame header format in which one of spare bits is used as an extension header indicator bit; and one additional octet which contains a most significant bit of the send sequence number, a most significant bit of the receive sequence number, and 4 selective acknowledgement bitmap bits.

In an embodiment of the disclosure, performing the acknowledged information transfer by using at least one extended frame header format may comprise receiving an acknowledgement from the second communication device in an S frame having a fourth frame header format. The fourth frame header format may be an extension of a third frame header format used when the size of the transmission window is smaller than or equal to 3.

In an embodiment of the disclosure, performing the acknowledged information transfer by using at least one extended frame header format may comprise sending an acknowledgement to the second communication device in an S frame having a fourth frame header format. The fourth frame header format may be an extension of a third frame header format used when the size of the transmission window is smaller than or equal to 3.

In an embodiment of the disclosure, the third frame header format may comprise 3 octets which contain 3 bits indicating receive sequence number and 3 selective acknowledgement bitmap bits. The fourth frame header format may comprise: the 3 octets of the third frame header format in which one of spare bits is used as an extension header indicator bit; and one additional octet which contains a most significant bit of the receive sequence number and 4 selective acknowledgement bitmap bits.

According to a fourth aspect of the disclosure, there is provided an originator. The originator may comprise at least one processor and at least one memory. The at least one memory may contain instructions executable by the at least one processor, whereby the originator may be operative to send, to a receiver, a request for negotiating a size of a transmission window with the receiver for an acknowledged information transfer through RDS protocol. The originator may be further operative to receive, from the receiver, a response to the request.

In an embodiment of the disclosure, the originator may be operative to perform the method according to the above first aspect.

According to a fifth aspect of the disclosure, there is provided a receiver. The receiver may comprise at least one processor and at least one memory. The at least one memory may contain instructions executable by the at least one processor, whereby the receiver may be operative to receive, from an originator, a request for negotiating a size of a transmission window with the receiver for an acknowledged information transfer through RDS protocol. The receiver may be further operative to send, to the originator, a response to the request.

In an embodiment of the disclosure, the receiver may be operative to perform the method according to the above second aspect.

According to a sixth aspect of the disclosure, there is provided a first communication device. The first communication device may comprise at least one processor and at least one memory. The at least one memory may contain instructions executable by the at least one processor, whereby the first communication device may be operative to, when a size of a transmission window is greater than 3, perform an acknowledged information transfer through RDS protocol, with a second communication device by using at least one extended frame header format. The at least one extended frame header format may be an extension of at least one normal frame header format used when the size of the transmission window is smaller than or equal to 3.

In an embodiment of the disclosure, the first communication device may be operative to perform the method according to the above second aspect.

According to a seventh aspect of the disclosure, there is provided a computer program product. The computer program product may comprise instructions which when executed by at least one processor, cause the at least one processor to perform the method according to any of the above first to third aspects.

According to an eighth aspect of the disclosure, there is provided a computer readable storage medium. The computer readable storage medium may comprise instructions which when executed by at least one processor, cause the at least one processor to perform the method according to any of the above first to third aspects.

According to a ninth aspect of the disclosure, there is provided an originator. The originator may comprise a sending module for sending, to a receiver, a request for negotiating a size of a transmission window with the receiver for an acknowledged information transfer through RDS protocol. The originator may further comprise a reception module for receiving, from the receiver, a response to the request.

According to a tenth aspect of the disclosure, there is provided a receiver. The receiver may comprise a reception module for receiving, from an originator, a request for negotiating a size of a transmission window with the receiver for an acknowledged information transfer through RDS protocol. The receiver may further comprise a sending module for sending, to the originator, a response to the request.

According to an eleventh aspect of the disclosure, there is provided a first communication device. The first communication device may comprise a transferring module for, when a size of a transmission window is greater than 3, performing an acknowledged information transfer through RDS protocol, with a second communication device by using at least one extended frame header format. The at least one extended frame header format may be an extension of at least one normal frame header format used when the size of the transmission window is smaller than or equal to 3.

According to a twelfth aspect of the disclosure, there is provided a method implemented in a communication system including an originator and a receiver. The method may comprise, at the originator, sending, to the receiver, a request for negotiating a size of a transmission window with the receiver for an acknowledged information transfer through RDS protocol. The method may further comprise, at the receiver, receiving, from the originator, the request for negotiating the size of the transmission window with the receiver for the acknowledged information transfer through RDS protocol. The method may further comprise, at the receiver, sending, to the originator, a response to the request. The method may further comprise, at the originator, receiving, from the receiver, the response to the request.

According to a thirteenth aspect of the disclosure, there is provided a communication system. The communication system may comprise an originator configured to: send, to a receiver, a request for negotiating a size of a transmission window with the receiver for an acknowledged information transfer through RDS protocol; and receive, from the receiver, a response to the request. The communication system may further comprise the receiver configured to: receive, from the originator, the request for negotiating the size of the transmission window with the receiver for the acknowledged information transfer through RDS protocol; and send, to the originator, the response to the request.

According to a fourteenth aspect of the disclosure, there is provided a method implemented in a communication system including a first communication device and a second communication device. The method may comprise, at the first communication device, when a size of a transmission window is greater than 3, performing an acknowledged information transfer through RDS protocol, with the second communication device by using at least one extended frame header format. The method may further comprise, at the second communication device, when the size of the transmission window is greater than 3, performing the acknowledged information transfer through RDS protocol, with the first communication device by using the at least one extended frame header format. The at least one extended frame header format may be an extension of at least one normal frame header format used when the size of the transmission window is smaller than or equal to 3.

According to a fifteenth aspect of the disclosure, there is provided a communication system. The communication system may comprise a first communication device configured to, when a size of a transmission window is greater than 3, perform an acknowledged information transfer through RDS protocol, with a second communication device by using at least one extended frame header format. The communication system may further comprise the second communication device configured to, when the size of the transmission window is greater than 3, perform an acknowledged information transfer through RDS protocol, with the first communication device by using the at least one extended frame header format. The at least one extended frame header format may be an extension of at least one normal frame header format used when the size of the transmission window is smaller than or equal to 3.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 11 is a flowchart illustrating a method performed by a first communication device according to an embodiment of the disclosure;

FIG. 12 is a flowchart for explaining the method of FIG. 11;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

The RDS protocol uses a packet header to identify if the packet requires no acknowledgement, requires an acknowledgement, or is an acknowledgment, and to allow detection and elimination of duplicate frames at the receiving endpoint. RDS supports both single and multiple applications within a UE. Port numbers in the header are used to identify the application on the originator and to identify the application on the receiver. The acknowledged data transfer provides message oriented reliable data delivery. The information is transferred in the unit of frame in RDS layer. In RDS acknowledged operation the information is transmitted in order in numbered Information (I) frames. The I frames are acknowledged at the RDS layer. Several I frames can be acknowledged at the same time. Flow control is implemented via a sliding window mechanism.

Figure 1:
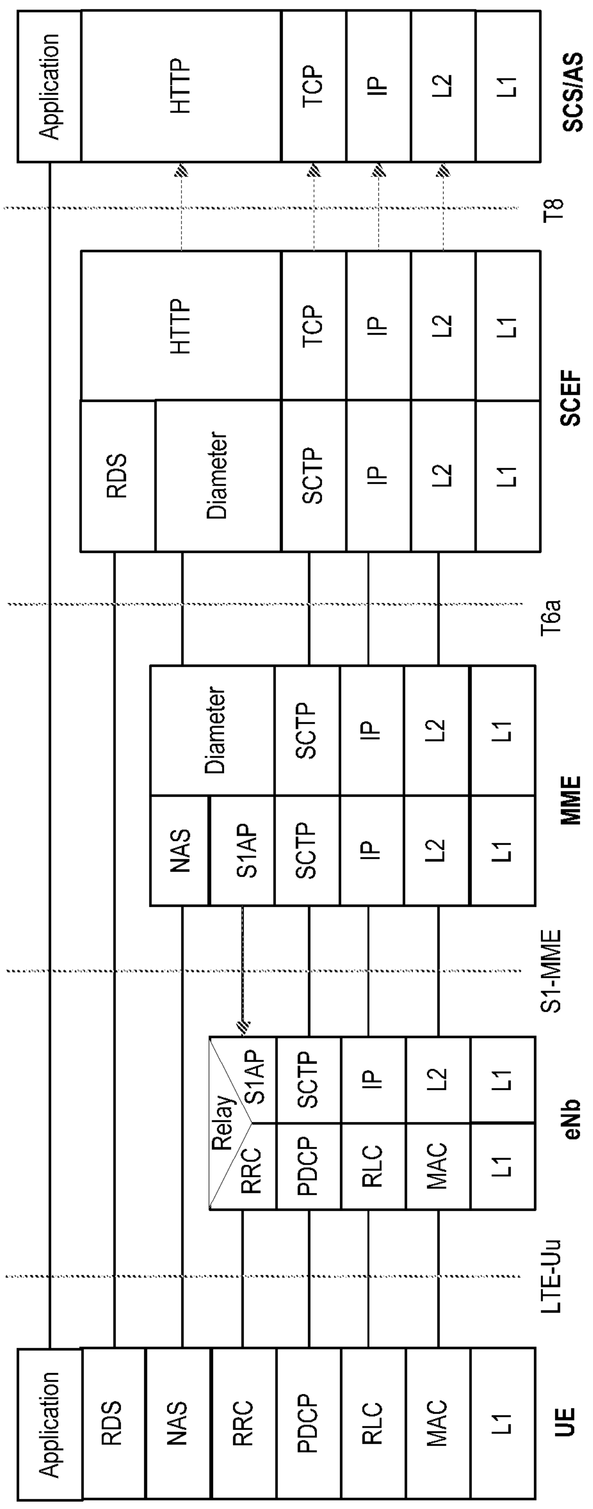
FIG. 1 is a diagram illustrating the protocol layering for RDS transfer.
Figure 2:
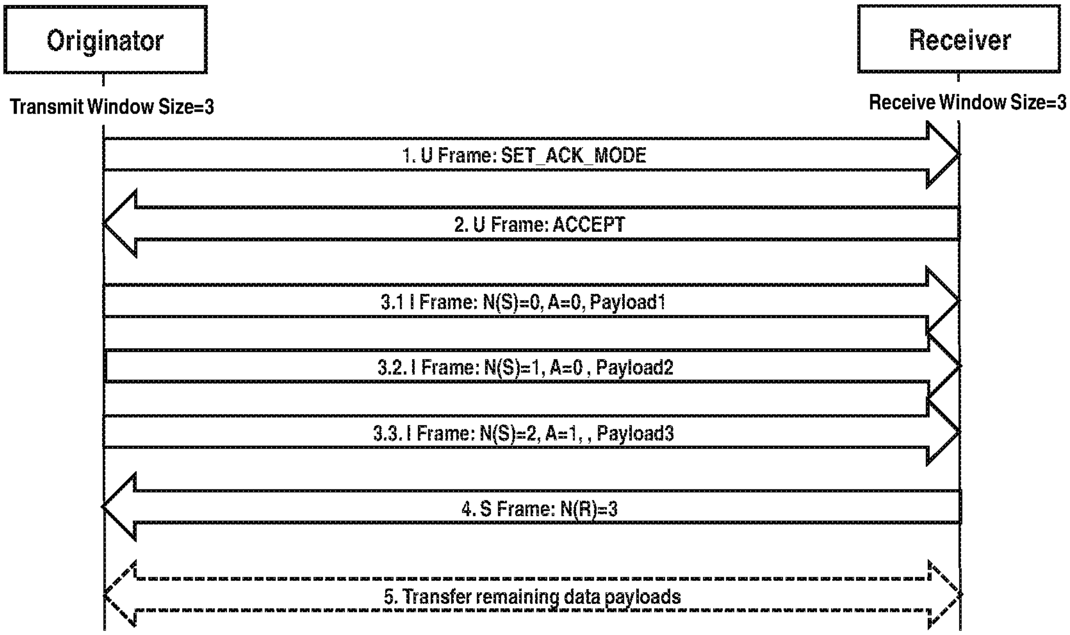
FIG. 2 is a diagram illustrating an RDS acknowledged data transfer.

FIG. 2 illustrates an RDS acknowledged data transfer procedure with the sliding window size set to 3. As shown, at step 1, the originator initiates the establishment of acknowledged transfer procedure by transmitting a SET_ACK_MODE command carried by a U frame to the receiver. At step 2, upon receiving the SET_ACK_MODE command, the receiver checks if the Destination Port number contained in the SET_ACK_MODE command corresponds to an application on the receiver. If the check is successful and if the application accepts to enter acknowledged transfer mode, the receiver shall send an ACCEPT response carried by a U frame to the originator.

At step 3, the originator has received multiple information blocks, say payload1, payload2, . . . , payloadN from upper layer, and it inserts each of the blocks into an individual I frame. These I frames are transmitted in ascending N(S) order. At any given time, the maximum number of sequentially-numbered I frames that may be outstanding (i.e. unacknowledged) should not be greater than the transmit window size. The originator shall request an acknowledgement from the receiver by transmitting an I or S frame with the A bit set to 1. An acknowledgement shall be requested when the last I frame in a sequence of one or more I frames is transmitted; or when the last I frame within the transmit window is transmitted.

At 4, when the receiver receives a valid I frame whose N(S) is in the receive window and the A bit of the received I frame was set to 1, it responds with an I or S frame containing the SACK bitmap to acknowledge the received I frames. Upon receiving the I frame whose N(S) is not in the receive window, the receiver shall discard the frame as a duplicate. At step 5, the flow repeats steps 3-4 to transmit the remaining information blocks.

The inventors found that the existing RDS protocol has the following problems. Firstly, NIDD RDS is not only required to support small data delivery but also required to support the sequential transmission of a batch of data blocks for firmware upgrade over the air (FOTA) or software upgrade over the air (SOTA). But the maximum sliding window size is only 3, which is very small. This results in that the receiver has to send a lot of acknowledgement frames and consume many network and UE resources for FOTA/SOTA via NIDD RDS. As shown in FIG. 2, the receiver has to send at least one acknowledgement S frame for every three I frames. In the real operator networks, considering packet loss, timeouts and retransmissions, more acknowledgement packets are needed. Suppose that an application server (AS) uses NIDD RDS to transfer a firmware file whose size is 250K bytes. Also suppose that the maximum payload size of the NIDD RDS I frame is 1K bytes, which means the firmware file is split into 250 data blocks. Also suppose that the RDS sliding window size is k, which is up to 3 from 1. Then, the total number of NIDD RDS acknowledgement messages transferred through the mobile network is 250/k. The minimum value is 84 when k=3, and the maximum value is 250 when k=1.

The sliding window size could depend on the resources of the devices. Devices with more resources are affordable for larger sliding window to gain higher efficiency while the ones with less resources could use smaller sliding window. Currently, there is no flexibility provided for devices to select proper sliding window size and for SCEF/PGW to select different window sizes for different devices.

Secondly, the existing NIDD RDS flow control mechanism does not specify any mechanism to align the transmit window size with the receive window size. This will cause inefficient data delivery, especially for the transmission of multiple sequential I frames, when the two window sizes are different with each other. The larger the gap between the transmit and receive window sizes, the more network and UE resources will be wasted.

If the transmit window size is greater than the receive window size, the sender may keep sending new I frames with sequence number out of the receive window range and get discarded by the receiver. Then the sender has to retransmit the frames and consequently consume more network and UE resources.

If the transmit window size is less than the receive window size, the sender will frequently request acknowledgement from the receiver even if the receiver has enough buffer to accept more I frames. Then the receiver has to transmit the acknowledgement response frequently and consequently consume more network and UE resources.

Figure 3:
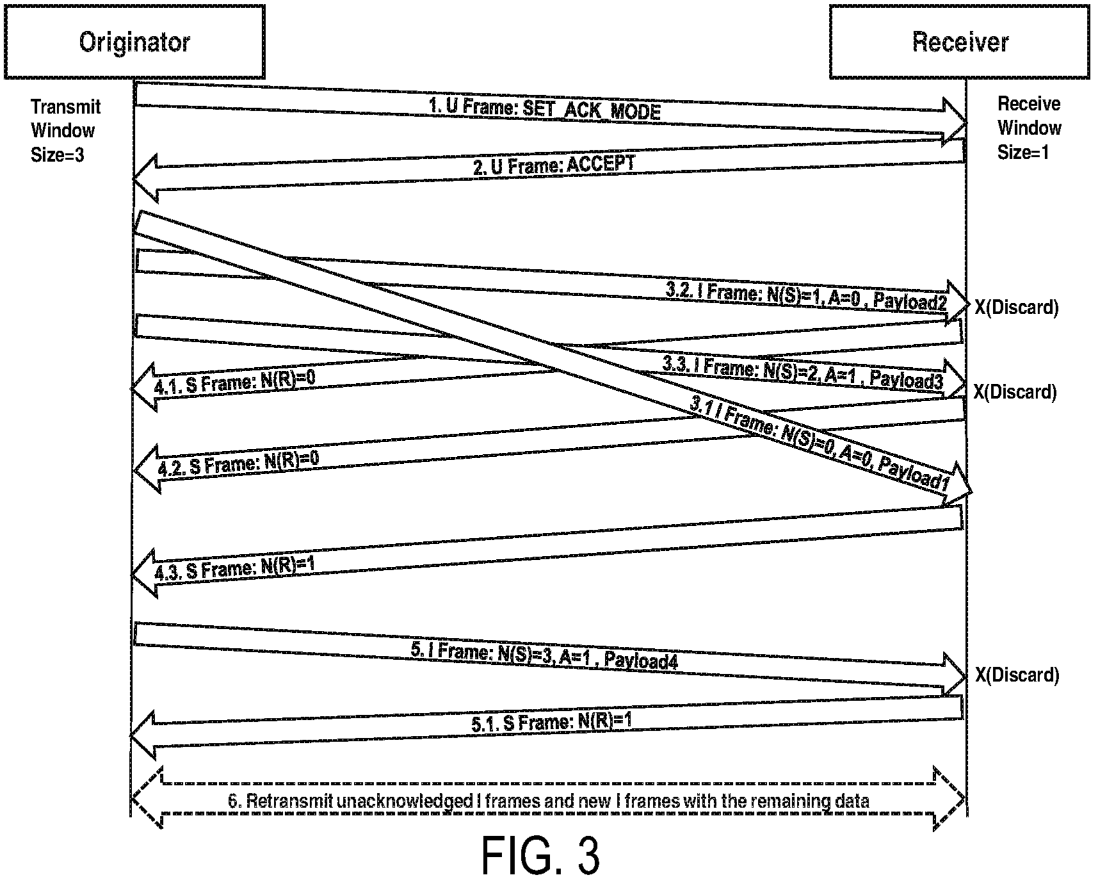
FIG. 3 is a diagram illustrating an RDS data delivery with different window sizes at the originator and the receiver.

For example, FIG. 3 illustrates an RDS reliable data delivery when the transmit window size is greater than the receive window size. It is assumed that: 1) the receive window size is 1; 2) the transmit window size is 3; 3) N(S) indicates the send sequence number of transmitted I frames; 4) N(R) indicates the expected send sequence number of the next in-sequence received I frame; 5) A indicates the Acknowledgement Request (A) bit and the A bit set to 1 is used to indicate that the receiver is requested to send an acknowledgement; and 6) the I frames may arrive out of the sequence order due to different transmission delay or packet loss and retransmission.

At step 1, the originator initiates the establishment of acknowledged transfer procedure by transmitting a SET_ACK_MODE command to receiver. At step 2, upon receiving the SET_ACK_MODE command, the receiver checks if the Destination Port number contained in the SET_ACK_MODE command corresponds to an application on the receiver. If the check is successful and if the application accepts to enter acknowledged transfer mode, the receiver shall send an ACCEPT response to the originator.

At step 3, the originator has received multiple information blocks, say payload1, payload2, . . . , payloadN from upper layer, and it inserts each of the blocks into an individual I frame. These I frames are transmitted in ascending N(S) order. The originator requests an acknowledgement from the receiver by setting the A bit to 1 in the last I frame, whose N(S) is set to 2, within the transmit window.

At step 4, upon receiving the I frames whose N(S) are not in the receive window, i.e. the I frames whose N(S) are not 0, the receiver discards the frames, and responds with an S frame for each one. For the I frame whose N(S) is in the receive window, i.e. the I frame with N(S)=0, the receiver responds an S frame with N(R) set to 1 for acknowledgement.

At step 5, after receiving the acknowledgement for the first I frame whose N(S)=0, the originator transmits a new I frame with payload4, N(S)=3 and A=1. Upon receiving the I frame with N(S)=3, which is not in the receive window, the receiver discards the frame, and responds with an S frame with N(R)=1. At step 6, the flow continues with the existing RDS acknowledged transfer procedure to retransmit the discarded frames and new I frames with remaining data blocks.

The present disclosure proposes an improved solution for RDS transfer. Hereinafter, the solution will be described in detail with reference to FIGS. 4-19.

Figure 4:
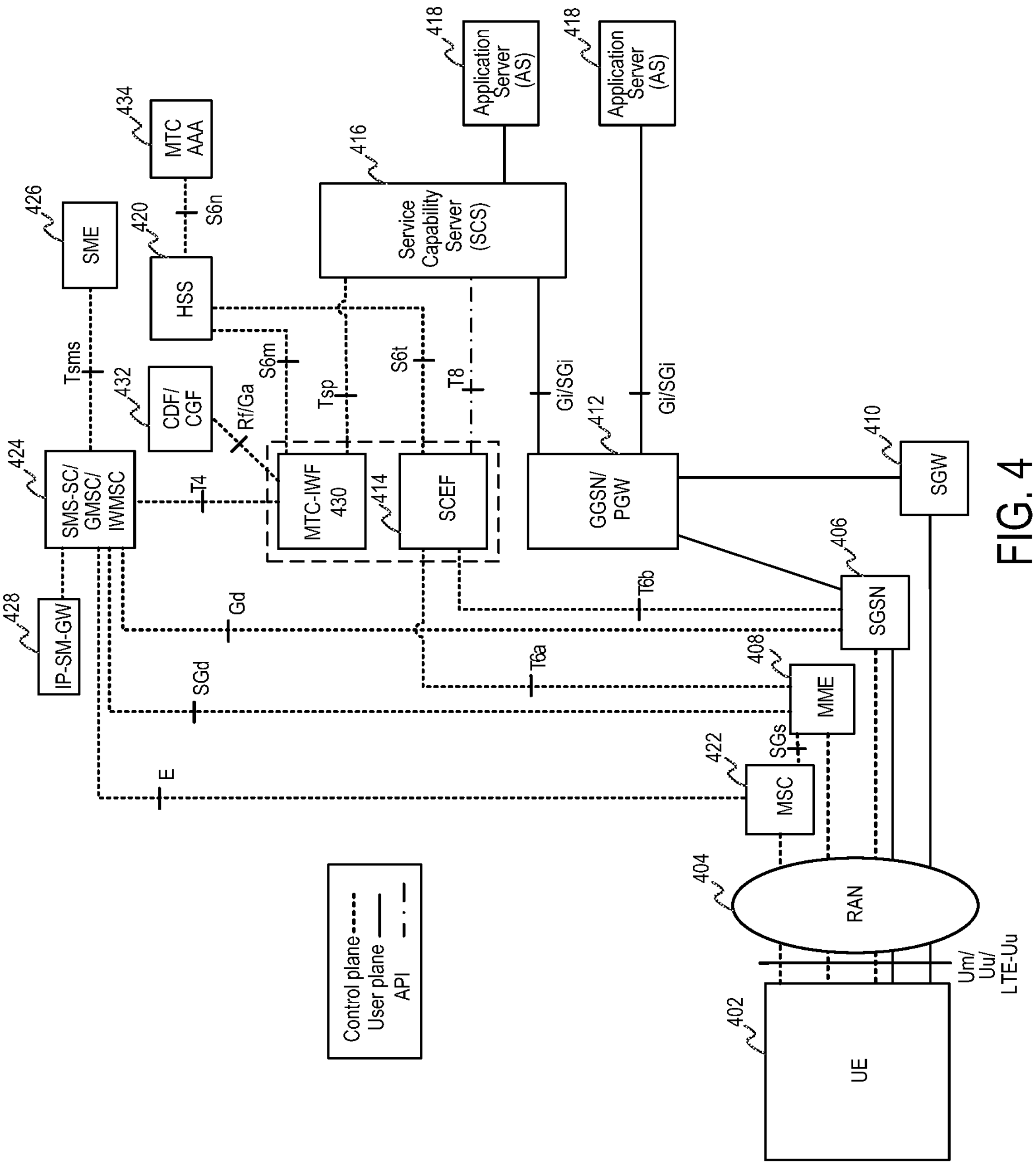
FIG. 4 is a diagram showing an exemplary communication system into which an embodiment of the disclosure is applicable.

FIG. 4 is a diagram showing an exemplary communication system into which an embodiment of the disclosure is applicable. As shown, the communication system comprises a user equipment (UE) 402, a radio access network (RAN) 404, a serving general packet radio service (GPRS) support node (SGSN) 406, a mobility management entity (MME) 408, a serving gateway (SGW) 410, a gateway GPRS support node (GGSN)/packet data network (PDN) gateway (PGW) 412, a service capability exposure function (SCEF) 414, a service capability server (SCS) 416, an application server (AS) 418 and a home subscriber server (HSS) 420. Note that the number of each entity mentioned above may be more than one.

The UE 402 can communicate through a radio access communication link with the RAN 404. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 404 may include, for example, a universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs or eNBs) that can provide the combined functionality of the RNC nodes and base stations of the UTRAN and the GERAN.

The SGSN 406 is a core network node in the UMTS and has a user-plane function and a control-plane function. The user-plane function of the SGSN 406 can transfer user data packets of the UE 402 between the RAN 404 and the GGSN/PGW 412. The control-plane function of the SGSN 406 can carry out mobility management of the UE 402, bearer management and the like. The MME 408 is a core network node in evolved packet system (EPS) and can carry out the mobility management of the UE 402, the bearer management, and the like. The SGW 410 is a packet transfer node in the core network of the EPS. The SGW 410 can transfer user data packets of the UE 402 between the RAN 404 and the GGSN/PGW 412.

The GGSN is a core network node in the UMTS. The PGW is a core network node in the EPS. The GGSN/PGW 412 means either the GGSN or the PGW or both. The GGSN/PGW 412 is a user-plane packet transfer node in the core network and can transfer user data packets of the UE 402. The GGSN/PGW 412 can serve as a gateway to an external PDN and provide the UE 402 with the connectivity to the external PDN.

The SCEF 414 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCS 416 can make open service access (OSA) standard interfaces accessible by application and provide an abstraction of network protocol for application developers. As a gateway between applications and the network, the SCS 420 can accomplish mapping of OSA interfaces onto network protocols and vice versa. The AS 418 may be a type of server designed to install, operate and host applications and associated services for users. The HSS 420 is a control-plane node in the core network of 3GPP public land mobile network (PLMN) and can manage subscriber information of the UE 402.

As shown in FIG. 4, the communication system may further comprise a mobile switching center (MSC) 422, a short message service (SMS)-service center (SC)/gateway mobile switching center (GMSC)/interworking MSC (IWMSC) 424, a short message entity (SME) 426, an IP-short message (SM)-gateway (GW) 428, a machine-type communication (MTC)-interworking function (IWF) 430, a charge data function (CDF)/charge gateway function (CGF) 432 and an MTC-authentication, authorization and accounting (AAA) 434. It should be noted that the SCEF 414, the PGW 412 and the SCS 416/AS 418 are merely exemplary examples of the components in the communication system and may be replaced by components with similar functionalities. For example, in 5G core (5GC), the SCEF may be replaced by a network exposure function (NEF), the PGW may be replaced by a user plane function (UPF), and the SCS/AS may be replaced by an application function (AF).

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Figure 5:
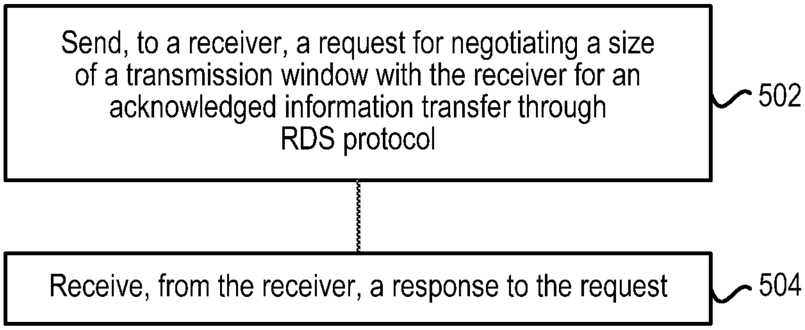
FIG. 5 is a flowchart illustrating a method performed by an originator according to an embodiment of the disclosure.

FIG. 5 is a flowchart illustrating a method performed by an originator according to an embodiment of the disclosure. The originator may be any communication device which can perform communication through RDS protocol. Examples of the originator include, but not limited to, a terminal device, an SCEF/NEF, a PGW/UPF and an SCS/AS/AF. At block 502, the originator sends, to a receiver, a request for negotiating a size of a transmission window with the receiver for an acknowledged information transfer through RDS protocol. Similar to the originator, the receiver may be any communication device which can perform communication through RDS protocol. Examples of the receiver include, but not limited to, a terminal device, an SCEF/NEF, a PGW/UPF and an SCS/AS/AF. In a case that the originator is a terminal device, the receiver may be an SCEF/NEF or a PGW/UPF or an SCS/AS/AF. On the other hand, in a case that the originator is an SCEF/NEF or a PGW/UPF or an SCS/AS/AF, the receiver may be a terminal device. At block 504, the originator receives, from the receiver, a response to the request. In this way, a window size negotiation mechanism can be provided for RDS.

For example, the request may comprise a first parameter indicating a first size of the transmission window expected to be used by the originator. Correspondingly, the response to the request may comprise a second parameter indicating a second size of the transmission window expected by the receiver. The second size of the transmission window may be smaller than or equal to the first size of the transmission window. In this way, the mismatch between RDS window sizes of the originator and the receiver can be avoided to improve the efficiency of RDS flow control, such that less network and UE resources can be consumed and the delivery time can be shortened. As an exemplary example, an RDS SET_PARAMETERS command containing a parameter called Window_Size may be used as the request. Correspondingly, an RDS SET_PARAMETERS response containing a parameter called Window_Size may be used as the response.

Optionally, the first size of the transmission window may be an integer ranging from 1 to a maximum value greater than 3. With this option, it is possible to support a larger RDS window size. As an exemplary example, the maximum value may be 7.

Figure 6:
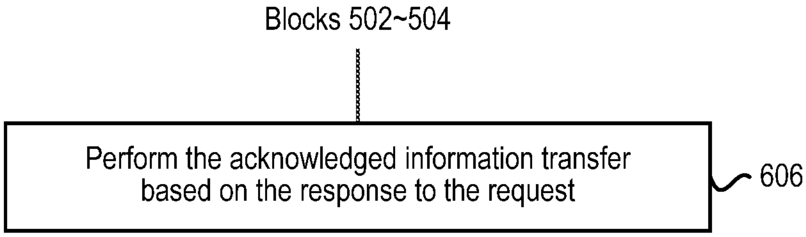
FIG. 6 is a flowchart illustrating a method performed by an originator according to an embodiment of the disclosure.
Figure 7:
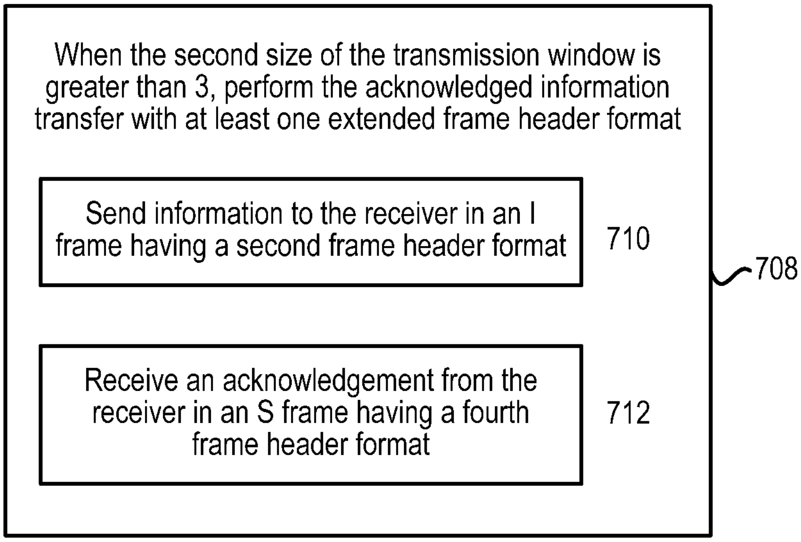
FIG. 7 is a flowchart for explaining the method of FIG. 6.

FIG. 6 is a flowchart illustrating a method performed by an originator according to an embodiment of the disclosure. As shown, the method comprises blocks 502-504 described above and block 606. At block 606, the originator performs the acknowledged information transfer based on the response to the request. For example, the acknowledged information transfer may be performed with the second size of the transmission window, which is the negotiated size of the transmission window. Optionally, when the second size (negotiated size) of the transmission window is greater than 3, block 606 may be implemented as block 708 at which the acknowledged information transfer is performed with at least one extended frame header format. The at least one extended frame header format is an extension of at least one normal frame header format used when the second size of the transmission window is smaller than or equal to 3. In this way, a larger RDS window size with fewer overheads can be supported with a mechanism compatible with the existing RDS protocol.

For example, block 708 may be implemented as including blocks 710 and 712. At block 710, the originator sends information to the receiver in an I frame having a second frame header format. The second frame header format is an extension of a first frame header format used when the second size of the transmission window is smaller than or equal to 3. For example, the first frame header format may comprise 3 octets which contain 3 bits indicating send sequence number, 3 bits indicating receive sequence number, and 3 selective acknowledgement bitmap bits. The second frame header format may comprises: the 3 octets of the first frame header format in which one of spare bits is used as an extension header indicator bit; and one additional octet which contain a most significant bit of the send sequence number, a most significant bit of the receive sequence number, and 4 selective acknowledgement bitmap bits.

At block 712, the originator receives an acknowledgement from the receiver in an S frame having a fourth frame header format. The fourth frame header format is an extension of a third frame header format used when the second size of the transmission window is smaller than or equal to 3. For example, the third frame header format may comprise 3 octets which contain 3 bits indicating receive sequence number and 3 selective acknowledgement bitmap bits. The fourth frame header format may comprise: the 3 octets of the third frame header format in which one of spare bits is used as an extension header indicator bit; and one additional octet which contain a most significant bit of the receive sequence number and 4 selective acknowledgement bitmap bits.

Figure 8:
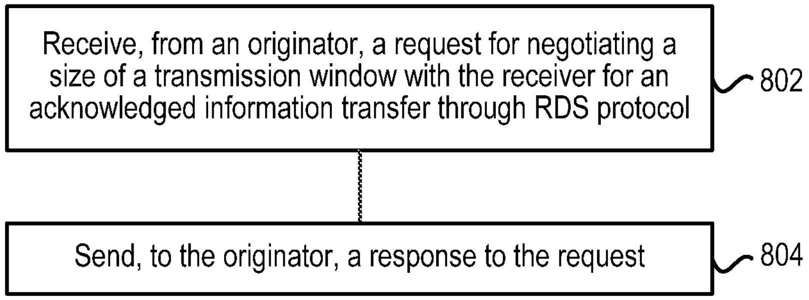
FIG. 8 is a flowchart illustrating a method performed by a receiver according to an embodiment of the disclosure.

FIG. 8 is a flowchart illustrating a method performed by a receiver according to an embodiment of the disclosure. At block 802, the receiver receives, from an originator, a request for negotiating a size of a transmission window with the receiver for an acknowledged information transfer through RDS protocol. As described above, the receiver and the originator may be any communication devices which can communicate through RDS protocol. At block 804, the receiver sends, to the originator, a response to the request. In this way, a window size negotiation mechanism can be provided for RDS.

As described above, the request may comprise a first parameter indicating a first size of the transmission window expected to be used by the originator. The response to the request may comprise a second parameter indicating a second size of the transmission window expected by the receiver. The second size of the transmission window is smaller than or equal to the first size of the transmission window. In this way, the mismatch between RDS window sizes of the originator and the receiver can be avoided to improve the efficiency of RDS flow control, such that less network and UE resources can be consumed and the delivery time can be shortened. As an exemplary example, an RDS SET_PARAMETERS command containing a parameter called Window_Size may be used as the request. Correspondingly, an RDS SET_PARAMETERS response containing a parameter called Window_Size may be used as the response.

Optionally, the first size of the transmission window may be an integer ranging from 1 to a maximum value greater than 3. With this option, it is possible to support a larger RDS window size. As an exemplary example, the maximum value may be 7.

Figure 9:
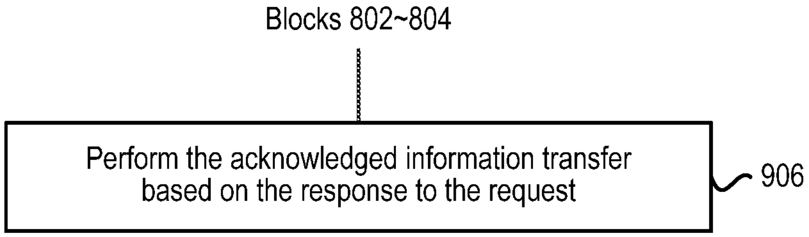
FIG. 9 is a flowchart illustrating a method performed by a receiver according to an embodiment of the disclosure.
Figure 10:
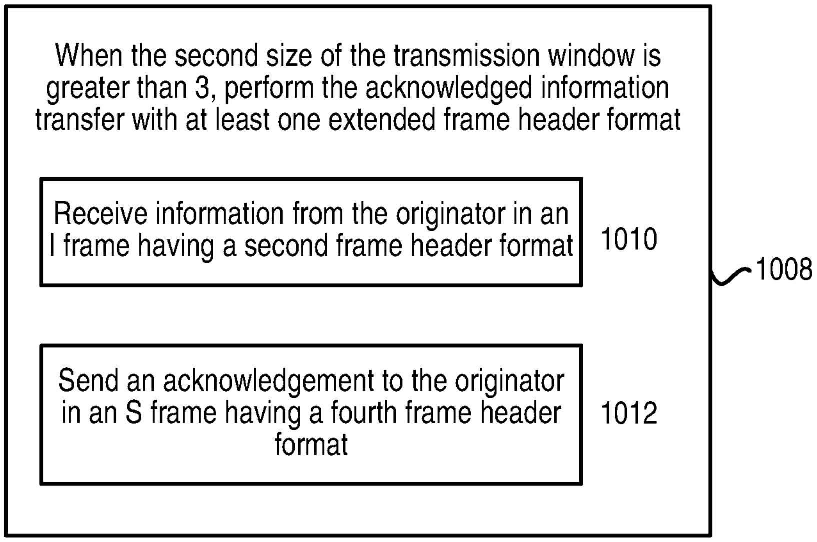
FIG. 10 is a flowchart for explaining the method of FIG. 9.

FIG. 9 is a flowchart illustrating a method performed by a receiver according to an embodiment of the disclosure. As shown, the method comprises blocks 802-804 described above and block 906. At block 906, the receiver performs the acknowledged information transfer based on the response to the request. For example, the acknowledged information transfer may be performed with the second size of the transmission window, which is the negotiated size of the transmission window. Optionally, when the second size (negotiated size) of the transmission window is greater than 3, block 906 may be implemented as block 1008 at which the acknowledged information transfer is performed with at least one extended frame header format. The at least one extended frame header format is an extension of at least one normal frame header format used when the second size of the transmission window is smaller than or equal to 3. In this way, a larger RDS window size with fewer overheads can be supported with a mechanism compatible with the existing RDS protocol.

For example, block 1008 may be implemented as including blocks 1010 and 1012. At block 1010, the receiver receives information from the originator in an I frame having a second frame header format. The second frame header format is an extension of a first frame header format used when the second size of the transmission window is smaller than or equal to 3. For example, the first frame header format may comprise 3 octets which contain 3 bits indicating send sequence number, 3 bits indicating receive sequence number, and 3 selective acknowledgement bitmap bits. The second frame header format may comprise: the 3 octets of the first frame header format in which one of spare bits is used as an extension header indicator bit; and one additional octet which contain a most significant bit of the send sequence number, a most significant bit of the receive sequence number, and 4 selective acknowledgement bitmap bits.

At block 1012, the receiver sends an acknowledgement to the originator in an S frame having a fourth frame header format. The fourth frame header format is an extension of a third frame header format used when the second size of the transmission window is smaller than or equal to 3. For example, the third frame header format may comprise 3 octets which contain 3 bits indicating receive sequence number and 3 selective acknowledgement bitmap bits. The fourth frame header format may comprise: the 3 octets of the third frame header format in which one of spare bits is used as an extension header indicator bit; and one additional octet which contain a most significant bit of the receive sequence number and 4 selective acknowledgement bitmap bits.

FIG. 11 is a flowchart illustrating a method performed by a first communication device according to an embodiment of the disclosure. At block 1102, when a size of a transmission window is greater than 3, the first communication device performs an acknowledged information transfer through RDS protocol with a second communication device by using at least one extended frame header format. The at least one extended frame header format is an extension of at least one normal frame header format used when the size of the transmission window is smaller than or equal to 3. In this way, a larger RDS window size with fewer overheads can be supported with a mechanism compatible with the existing RDS protocol.

The first communication device and the second communication device may be any communication devices which can communicate through RDS protocol. Examples of the first or second communication device include, but not limited to, a terminal device, an SCEF/NEF, a PGW/UPF and an SCS/AS/AF. In a case that the first communication device is a terminal device, the second communication device may be an SCEF/NEF or a PGW/UPF or an SCS/AS/AF. On the other hand, in a case that the first communication device is an SCEF/NEF or a PGW/UPF or an SCS/AS/AF, the second communication device may be a terminal device.

For example, block 1102 may be implemented as blocks 1204-1210. At block 1204, the first communication device sends information to the second communication device in an I frame having a second frame header format. The second frame header format is an extension of a first frame header format used when the second size of the transmission window is smaller than or equal to 3. In this case, the first communication device may be an originator. At block 1206, the first communication device receives information from the second communication device in an I frame having a second frame header format. The second frame header format is an extension of a first frame header format used when the second size of the transmission window is smaller than or equal to 3. In this case, the first communication device may be a receiver.

For blocks 1204 and 1206, the first frame header format may comprise 3 octets which contain 3 bits indicating send sequence number, 3 bits indicating receive sequence number, and 3 selective acknowledgement bitmap bits. The second frame header format may comprise: the 3 octets of the first frame header format in which one of spare bits is used as an extension header indicator bit; and one additional octet which contain a most significant bit of the send sequence number, a most significant bit of the receive sequence number, and 4 selective acknowledgement bitmap bits.

At block 1208, the first communication device receives an acknowledgement from the second communication device in an S frame having a fourth frame header format. The fourth frame header format is an extension of a third frame header format used when the second size of the transmission window is smaller than or equal to 3. In this case, the first communication device may be an originator. At block 1210, the first communication device sends an acknowledgement to the second communication device in an S frame having a fourth frame header format. The fourth frame header format is an extension of a third frame header format used when the second size of the transmission window is smaller than or equal to 3. In this case, the first communication device may be a receiver.

For blocks 1208 and 1210, the third frame header format may comprise 3 octets which contain 3 bits indicating receive sequence number and 3 selective acknowledgement bitmap bits. The fourth frame header format may comprises: the 3 octets of the third frame header format in which one of spare bits is used as an extension header indicator bit; and one additional octet which contain a most significant bit of the receive sequence number and 4 selective acknowledgement bitmap bits.

Based on the above description, at least one aspect of the present disclosure provides a method implemented in a communication system including an originator and a receiver. The method may comprise, at the originator, sending, to the receiver, a request for negotiating a size of a transmission window with the receiver for an acknowledged information transfer through RDS protocol. The method may further comprise, at the receiver, receiving, from the originator, the request for negotiating the size of the transmission window with the receiver for the acknowledged information transfer through RDS protocol. The method may further comprise, at the receiver, sending, to the originator, a response to the request. The method may further comprise, at the originator, receiving, from the receiver, the response to the request.

In addition, at least one aspect of the present disclosure provides a method implemented in a communication system including a first communication device and a second communication device. The method may comprise, at the first communication device, when a size of a transmission window is greater than 3, performing an acknowledged information transfer through RDS protocol, with the second communication device by using at least one extended frame header format. The method may further comprise, at the second communication device, when the size of the transmission window is greater than 3, performing the acknowledged information transfer through RDS protocol, with the first communication device by using the at least one extended frame header format. The at least one extended frame header format may be an extension of at least one normal frame header format used when the size of the transmission window is smaller than or equal to 3.

Figures 13, 14:
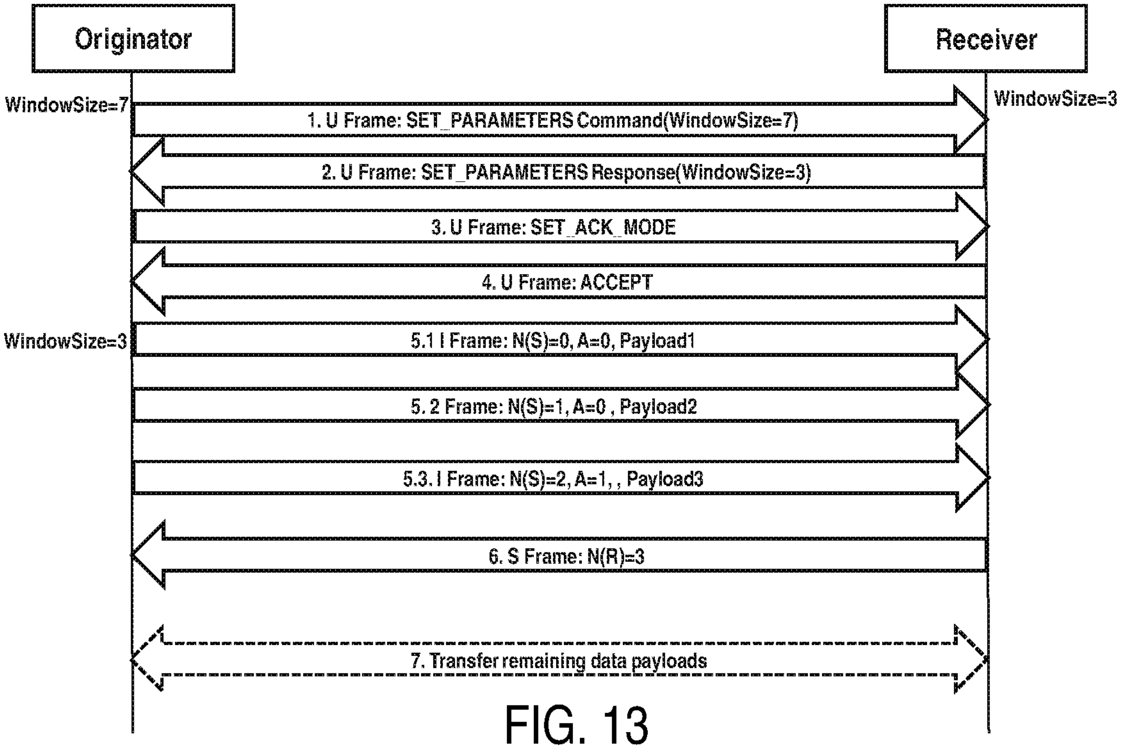
FIG. 13 is a diagram illustrating an exemplary process of window size negotiation according to an embodiment of the disclosure.
FIG. 14 is a diagram illustrating exemplary extended frame header formats according to an embodiment of the disclosure.

FIG. 13 is a diagram illustrating an exemplary process of window size negotiation according to an embodiment of the disclosure. In this process, RDS SET_PARAMETERS command/response is used to negotiate the window size between a UE and an SCEF/PGW. A new RDS parameter Window_Size is introduced for this purpose. Table 1 below shows the definition of this new parameter.

TABLE 1

Window_Size parameter

| Parameter Name | Type | Length | Format (87654321) | Range |
|---|---|---|---|---|
| Window_Size | 0 | 1 | bbbbbbbb | 1 through 7 |

With the Window_Size parameter, the originator can initiate window size negotiation before an RDS acknowledged data transfer is issued. If the negotiated window size is greater than 3 (i.e. the existing maximum RDS window size), both the originator and the receiver can use an extended frame header format (described later) for communication. Otherwise, the normal RDS header format is used for backward compatibility consideration.

At step 1, the originator sends expected window size 7 through the U frame SET_PARAMETERS command to the receiver for window size negotiation. At step 2, upon receiving the U frame SET_PARAMETERS command with window size (e.g. 7), the receiver sends a SET_PARAMETERS response, either confirming the window size parameter value by returning the requested value or proposing a smaller one in their place. The receiver should not propose a greater window size value than the requested one. For example, the receiver proposes a smaller window size 3 according to its configuration or capability. Both the originator and the receiver shall use the negotiated values after the completion of the negotiation process. At step 3, the originator initiates the establishment of acknowledged transfer procedure by transmitting a SET_ACK_MODE command carried by a U frame to the receiver. At step 4, upon receiving the SET_ACK_MODE command, the receiver sends an ACCEPT response carried by a U frame to the originator.

At step 5, the originator has received multiple information blocks, say payload1, payload2, . . . , payloadN from upper layer, and it inserts each of the blocks into an individual I frame. These I frames are transmitted in ascending N(S) order. At any given time, the maximum number of sequentially-numbered I frames that may be outstanding (i.e. unacknowledged) should not greater than the transmit window size. The originator shall request an acknowledgement from the receiver by transmitting an I or S frame with the A bit set to 1. An acknowledgement shall be requested when the last I frame in a sequence of one or more I frames is transmitted, or when the last I frame within the transmit window is transmitted.

At step 6, when the receiver receives a valid I frame whose N(S) is in the receive window and the A bit of the received I frame was set to 1, it responds with an I or S frame containing the SACK bitmap to acknowledge the received I frames. Upon receiving the I frame whose N(S) is not in the receive window, the receiver shall discard the frame as a duplicate. At step 7, the flow repeats steps 5-6 to transmit the remaining information blocks.

FIG. 14 is a diagram illustrating exemplary extended frame header formats according to an embodiment of the disclosure. The exemplary extended frame header formats support the maximum sliding window size 7. This can support efficient transmission of multiple sequential I frames with a larger sliding window size. Note that if more control field bits are introduced, a larger window size greater than 7 can be supported, but a longer header will cause more overheads. Also note that there is no change for UI and U frame format which may be as defined in FIG. 5.2.1-1 of 3GPP TS 24.250 V16.2.0.

The description for each filed shown in FIG. 14 is shown in table 2 below. All the new fields are highlighted with underlines.

TABLE 2

Address and Control field bits description

| Control field bits | Description |
|---|---|
| A | Acknowledgement request bit |
| Mn | Unnumbered function bit |
| N(R) | Receive sequence number |
| N(S) | Send sequence number |
| N(U) | Unconfirmed sequence number |
| Sn | Supervisory function bit |
| Rn | Selective acknowledgement bitmap bit, new bits R4-7 are introduced to extend the maximum sliding window size from 3 to 7. |
| PD | Protocol Discriminator bit |
| C/R | Command/Response bit |
| ADS | Address bit |
| Source Port | Source port number |
| Destination Port | Destination port number |
| X | Spare bit |
| E | Extension header indicator bit |
| Ext-N(S) | The most significant bit of the send sequence number. The complete send sequence number is composed with this bit and N(S) |
| Ext-N(R) | The most significant bit of the receive sequence number. The complete receive sequence number is composed with this bit and N(R) |

Comparing with the existing RDS frame header format, the differences lie in the following five points: 1) one of the existing spare bits in I and S frame is used as Extension header indicator, which controls if the optional extension byte is present or not; 2) one more optional header byte is introduced to support a larger sliding window size in I and S frame; 3) 1-bit field Ext-N(S) in the optional extension byte is introduced to extend the sending sequence number N(S) filed from 3 bits to 4 bits; 4) 1-bit field Ext-N(R) in the optional extension byte is introduced to extend the receive sequence number filed N(R) from 3 bits to 4 bits; 5) 4-bits R4, R5, R6 and R7 in the optional extension byte are introduced to extend the selective acknowledgement bitmap.

Figure 15:
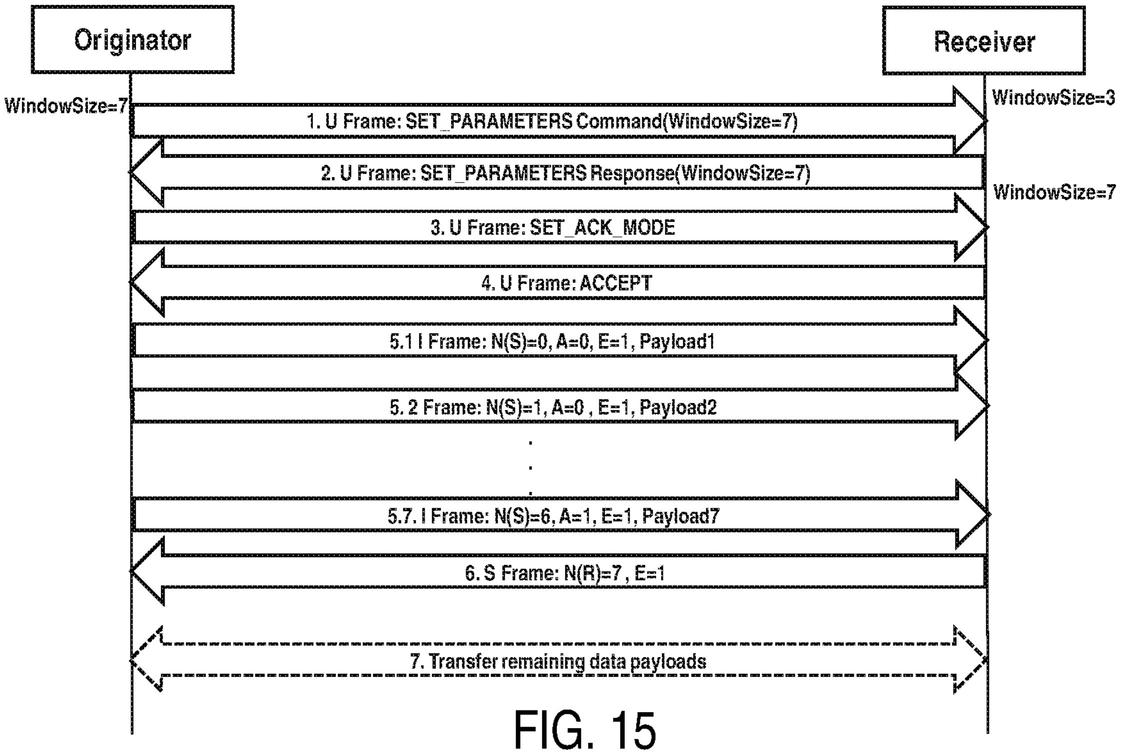
FIG. 15 is a diagram illustrating an exemplary process of acknowledged data transfer according to an embodiment of the disclosure.

FIG. 15 is a diagram illustrating an exemplary message flow of an acknowledged RDS data transfer with window size negotiation and extended RDS header format. It is assumed that: 1) the negotiated window size is 7; 2) N(S) indicates the send sequence number of transmitted I frames; 3) N(R) indicates the expected send sequence number of the next in-sequence received I frame; 4) A indicates the Acknowledgement Request (A) bit and the A bit set to 1 is used to indicate that the receiver is requested to send an acknowledgement; and 5) E indicates the Extension Header Indicator bit and the E bit set to 1 is used to indicate the extension byte present.

At step 1, the originator sends expected window size 7 through the U frame SET_PARAMETERS command to the receiver for window size negotiation. At step 2, upon receiving the U frame SET_PARAMETERS command with window size 7, the receiver sends a SET_PARAMETERS response with the requested value. At step 3, the originator initiates the establishment of acknowledged transfer procedure by transmitting a SET_ACK_MODE command carried by a U frame to the receiver. At step 4, upon receiving the SET_ACK_MODE command, the receiver sends an ACCEPT response carried by a U frame to the originator.

At step 5, the originator has received multiple information blocks, say payload1, payload2, . . . , payloadN from upper layer, and it inserts each of the blocks into an individual I frame with the extended header format as the negotiated window size is greater than 3. These I frames are transmitted in ascending N(S) order. The originator can transmit up to 7 information blocks/frames ahead of the latest acknowledgment. At any given time, the maximum number of sequentially-numbered I frames that may be outstanding (i.e. unacknowledged) should not greater than the transmit window size 7. The originator shall request an acknowledgement from the receiver by transmitting an I or S frame with the A bit set to 1. An acknowledgement shall be requested when the last I frame in a sequence of one or more I frames is transmitted, or when the last I frame within the transmit window is transmitted.

At step 6, when the receiver receives a valid I frame whose N(S) is in the receive window and the A bit of the received I frame was set to 1, it responds with an I or S frame containing the SACK bitmap to acknowledge the received I frames. Upon receiving the I frame whose N(S) is not in the receive window, the receiver shall discard the frame as a duplicate. The S frame uses the extended header format as the negotiated window size is greater than 3. At step 7, the flow repeats steps 5-6 to transmit the remaining information blocks.

Suppose k is the window size of RDS and N is the total information blocks to be transferred. When k=3, the minimal number of acknowledgement frames is N/3. It is N/7 when k=7. So, the efficiency gains with window size 7 comparing with window size 3 is: $(N/3-N/7)/N/3=4/7\approx 57\%$. This means comparing with the window size of 3, using a larger window size 7 can save at least 57% acknowledgement message transmission and delay time without considering the data loss.

Figure 16:
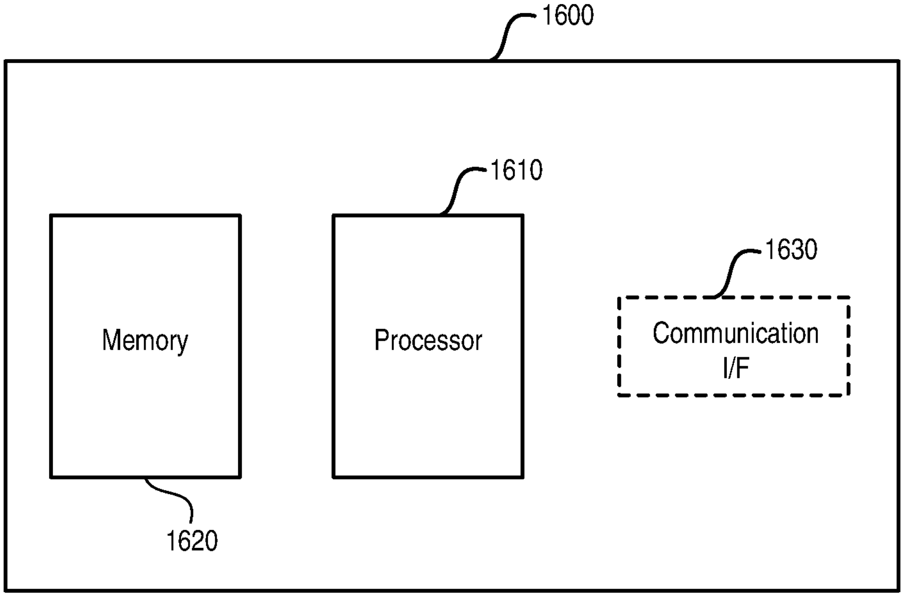
FIG. 16 is a block diagram showing an apparatus suitable for use in practicing some embodiments of the disclosure.

FIG. 16 is a block diagram showing an apparatus suitable for use in practicing some embodiments of the disclosure. For example, any one of the originator, the receiver and the first communication device described above may be implemented through the apparatus 1600. As shown, the apparatus 1600 may include a processor 1610, a memory 1620 that stores a program, and optionally a communication interface 1630 for communicating data with other external devices through wired and/or wireless communication.

The program includes program instructions that, when executed by the processor 1610, enable the apparatus 1600 to operate in accordance with the embodiments of the present disclosure, as discussed above. That is, the embodiments of the present disclosure may be implemented at least in part by computer software executable by the processor 1610, or by hardware, or by a combination of software and hardware.

The memory 1620 may be of any type suitable to the local technical environment and may be implemented using any suitable data storage technology, such as semiconductor based memory devices, flash memories, magnetic memory devices and systems, optical memory devices and systems, fixed memories and removable memories. The processor 1610 may be of any type suitable to the local technical environment, and may include one or more of general purpose computers, special purpose computers, microprocessors, digital signal processors (DSPs) and processors based on multi-core processor architectures, as non-limiting examples.

Figure 17:
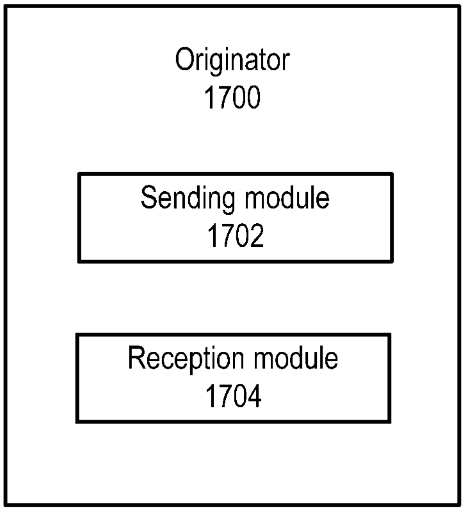
FIG. 17 is a block diagram showing an originator according to an embodiment of the disclosure.

FIG. 17 is a block diagram showing an originator according to an embodiment of the disclosure. As shown, the originator 1700 comprises a sending module 1702 and a reception module 1704. The sending module 1702 may be configured to send, to a receiver, a request for negotiating a size of a transmission window with the receiver for an acknowledged information transfer through RDS protocol, as described above with respect to block 502. The reception module 1704 may be configured to receive, from the receiver, a response to the request, as described above with respect to block 504.

Figure 18:
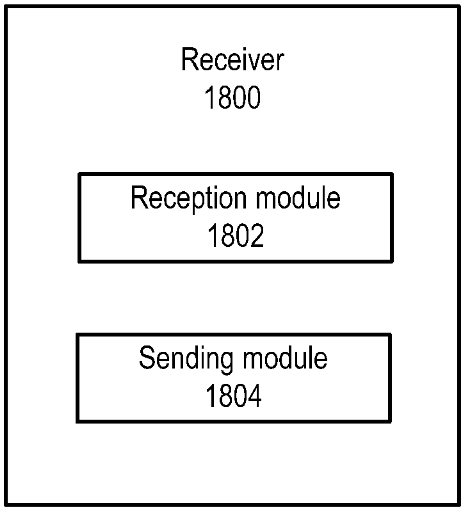
FIG. 18 is a block diagram showing a receiver according to an embodiment of the disclosure.

FIG. 18 is a block diagram showing a receiver according to an embodiment of the disclosure. As shown, the receiver 1800 comprises a reception module 1802 and a sending module 1804. The reception module 1802 may be configured to receive, from an originator, a request for negotiating a size of a transmission window with the receiver for an acknowledged information transfer through RDS protocol, as described above with respect to block 802. The sending module 1804 may be configured to send, to the originator, a response to the request, as described above with respect to block 804.

Figure 19:
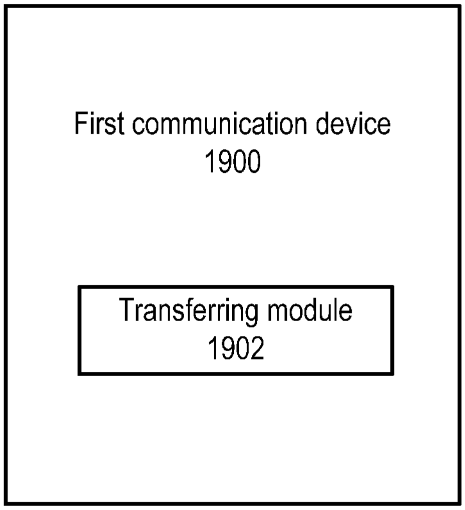
FIG. 19 is a block diagram showing a first communication device according to an embodiment of the disclosure.

FIG. 19 is a block diagram showing a first communication device according to an embodiment of the disclosure. As shown, the first communication device 1900 comprises a transferring module 1902. The transferring module 1902 may be configured to, when a size of a transmission window is greater than 3, perform an acknowledged information transfer through RDS protocol with a second communication device by using at least one extended frame header format, as described above with respect to block 1102. The at least one extended frame header format is an extension of at least one normal frame header format used when the size of the transmission window is smaller than or equal to 3. The modules described above may be implemented by hardware, or software, or a combination of both.

Based on the above description, at least one aspect of the present disclosure provides a communication system. The communication system may comprise an originator configured to: send, to a receiver, a request for negotiating a size of a transmission window with the receiver for an acknowledged information transfer through RDS protocol; and receive, from the receiver, a response to the request. The communication system may further comprise the receiver configured to: receive, from the originator, the request for negotiating the size of the transmission window with the receiver for the acknowledged information transfer through RDS protocol; and send, to the originator, the response to the request.

In addition, at least one aspect of the present disclosure provides a communication system. The communication system may comprise a first communication device configured to, when a size of a transmission window is greater than 3, perform an acknowledged information transfer through RDS protocol, with a second communication device by using at least one extended frame header format. The communication system may further comprise the second communication device configured to, when the size of the transmission window is greater than 3, perform an acknowledged information transfer through RDS protocol, with the first communication device by using the at least one extended frame header format. The at least one extended frame header format may be an extension of at least one normal frame header format used when the size of the transmission window is smaller than or equal to 3.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by an originator, the method comprising:

sending, to a receiver, a request for negotiating a size of a transmission window with the receiver for an acknowledged information transfer through reliable data service (RDS) protocol, wherein the request comprises a first parameter indicating a first size of the transmission window expected to be used by the originator; and receiving, from the receiver, a response to the request, wherein the response to the request comprises a second parameter indicating a second size of the transmission window expected by the receiver, the second size of the transmission window being smaller than or equal to the first size of the transmission window, wherein performing the acknowledged information transfer comprises:

when the second size of the transmission window is greater than 3, performing the acknowledged information transfer with at least one extended frame header format;

wherein the at least one extended frame header format is an extension of at least one normal frame header format used when the second size of the transmission window is smaller than or equal to 3.

2. The method of claim 1, further comprising:

performing the acknowledged information transfer based on the response to the request.

3. The method according to claim 1, wherein the first size of the transmission window is an integer ranging from 1 to a maximum value greater than 3.

4. The method of claim 1, wherein the acknowledged information transfer is performed with the second size of the transmission window.

5. The method of claim 1, wherein the request is an RDS SET_PARAMETERS command and the response is an RDS SET_PARAMETERS response.

6. The method of claim 5, wherein each of the RDS SET_PARAMETERS command and the RDS SET_PARAMETERS response comprises a parameter called Window_Size.

7. The method of claim 1, wherein the originator or the receiver is one of:

a terminal device;

a service capability exposure function (SCEF)

a packet data network gateway (PGW);

a network exposure function (NEF);

a user plane function (UPF);

a service capability server (SCS);

an application server (AS); or an application function (AF).

8. The method of claim 1, wherein performing the acknowledged information transfer with at least one extended frame header format comprises:

sending information to the receiver in an I frame having a second frame header format, the second frame header format being an extension of a first frame header format used when the second size of the transmission window is smaller than or equal to 3.

9. The method of claim 8, wherein the first frame header format comprises 3 octets which contain 3 bits indicating send sequence number, 3 bits indicating receive sequence number, and 3 selective acknowledgement bitmap bits; and wherein the second frame header format comprises: the 3 octets of the first frame header format in which one of spare bits is used as an extension header indicator bit; and one additional octet which contains a most significant bit of the send sequence number, a most significant bit of the receive sequence number, and 4 selective acknowledgement bitmap bits.

10. The method of claim 1, wherein performing the acknowledged information transfer with at least one extended frame header format comprises:

receiving an acknowledgement from the receiver in an S frame having a fourth frame header format, the fourth frame header format being an extension of a third frame header format used when the second size of the transmission window is smaller than or equal to 3.

11. The method of claim 10, wherein the third frame header format comprises 3 octets which contain 3 bits indicating receive sequence number and 3 selective acknowledgement bitmap bits; and wherein the fourth frame header format comprises: the 3 octets of the third frame header format in which one of spare bits is used as an extension header indicator bit; and one additional octet which contains a most significant bit of the receive sequence number and 4 selective acknowledgement bitmap bits.

12. A method performed by a receiver, comprising:

receiving, from an originator, a request for negotiating a size of a transmission window with the receiver for an acknowledged information transfer through reliable data service (RDS) protocol, wherein the request comprises a first parameter indicating a first size of the transmission window expected to be used by the originator; and sending, to the originator, a response to the request, wherein the response to the request comprises a second parameter indicating a second size of the transmission window expected by the receiver, the second size of the transmission window being smaller than or equal to the first size of the transmission window, wherein performing the acknowledged information transfer comprises:

when the second size of the transmission window is greater than 3, performing the acknowledged information transfer with at least one extended frame header format;

wherein the at least one extended frame header format is an extension of at least one normal frame header format used when the second size of the transmission window is smaller than or equal to 3.

13. The method of claim 12, further comprising:

performing the acknowledged information transfer based on the response to the request.

14. The method of claim 12, wherein performing the acknowledged information transfer with at least one extended frame header format comprises:

receiving information from the originator in an I frame having a second frame header format, the second frame header format being an extension of a first frame header format used when the second size of the transmission window is smaller than or equal to 3.

15. The method according to claim 14, wherein the first frame header format comprises 3 octets which contain 3 bits indicating send sequence number, 3 bits indicating receive sequence number, and 3 selective acknowledgement bitmap bits; and wherein the second frame header format comprises: the 3 octets of the first frame header format in which one of spare bits is used as an extension header indicator bit; and one additional octet which contains a most significant bit of the send sequence number, a most significant bit of the receive sequence number, and 4 selective acknowledgement bitmap bits.

16. The method according to claim 12, wherein performing the acknowledged information transfer with at least one extended frame header comprises:

sending an acknowledgement to the originator in an S frame having a fourth frame header format, the fourth frame header format being an extension of a third frame header format used when the second size of the transmission window is smaller than or equal to 3.

17. The method according to claim 16, wherein the third frame header format comprises 3 octets which contain 3 bits indicating receive sequence number and 3 selective acknowledgement bitmap bits; and wherein the fourth frame header format comprises: the 3 octets of the third frame header format in which one of spare bits is used as an extension header indicator bit; and one additional octet which contains a most significant bit of the receive sequence number and 4 selective acknowledgement bitmap bits.

18. An originator comprising:

at least one processor; and at least one memory, the at least one memory containing instructions executable by the at least one processor, wherein the originator is configured to:

send, to a receiver, a request for negotiating a size of a transmission window with the receiver for an acknowledged information transfer through reliable data service (RDS) protocol, wherein the request comprises a first parameter indicating a first size of the transmission window expected to be used by the originator; and receive, from the receiver, a response to the request, wherein the response to the request comprises a second parameter indicating a second size of the transmission window expected by the receiver, the second size of the transmission window being smaller than or equal to the first size of the transmission window, wherein performing the acknowledged information transfer comprises:

when the second size of the transmission window is greater than 3, performing the acknowledged information transfer with at least one extended frame header format;

wherein the at least one extended frame header format is an extension of at least one normal frame header format used when the second size of the transmission window is smaller than or equal to 3.

* * * * *